Nov. 18, 1941.   F. R. CONKLIN ET AL   2,262,989
METHOD FOR FORMING THERMOPLASTIC SHEETING
Filed March 26, 1938   2 Sheets-Sheet 1
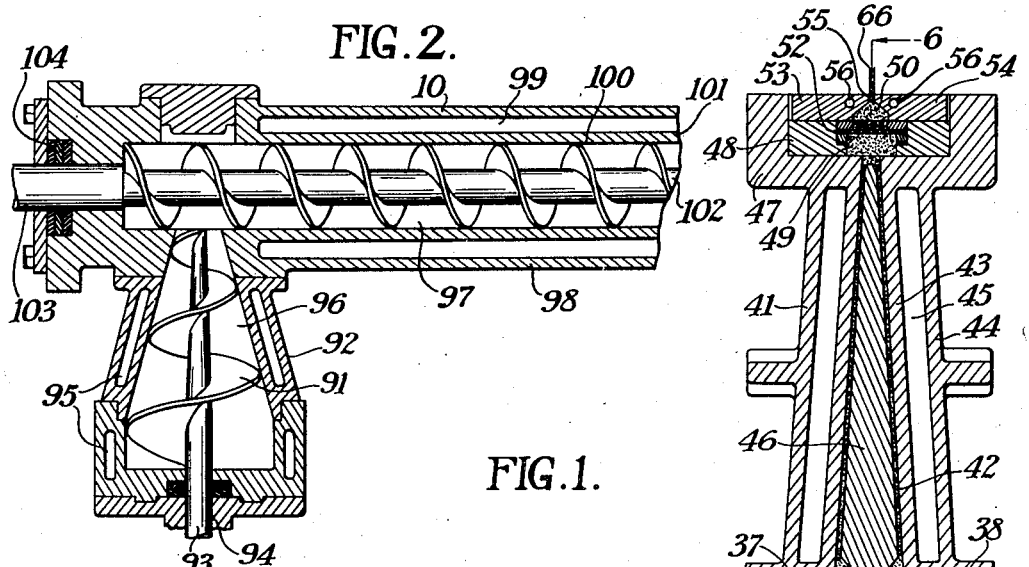
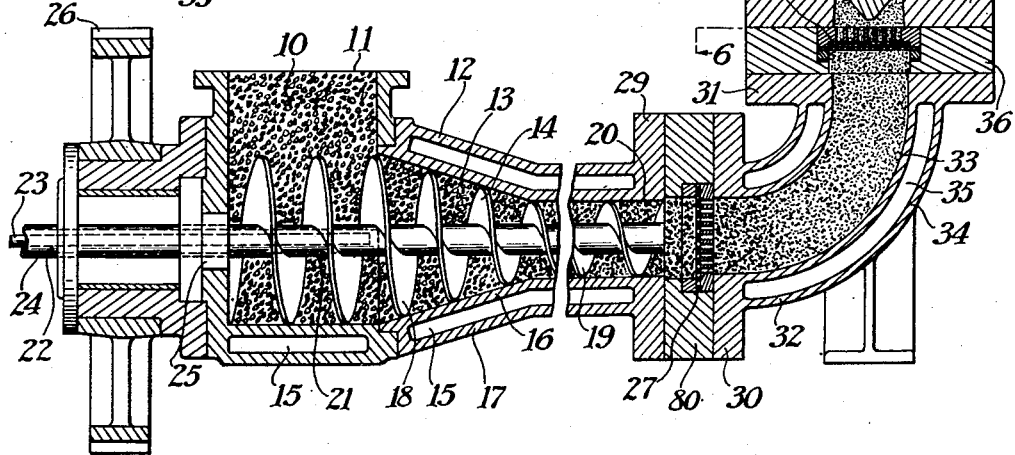
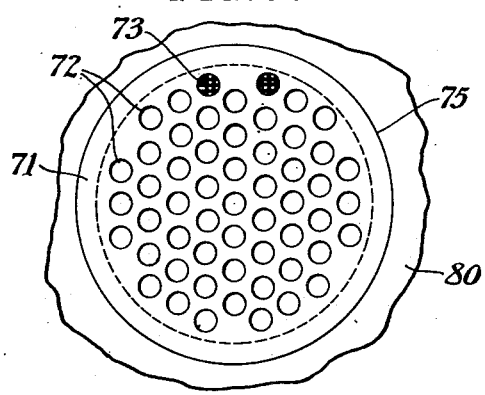
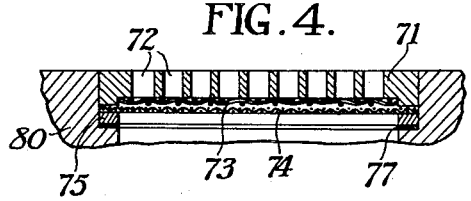
Frederick R. Conklin
John S. Kimble
INVENTORS
BY
ATTORNEYS Nov. 18, 1941.  F. R. CONKLIN ET AL  2,262,989
METHOD FOR FORMING THERMOPLASTIC SHEETING
Filed March 26, 1938   2 Sheets-Sheet 2
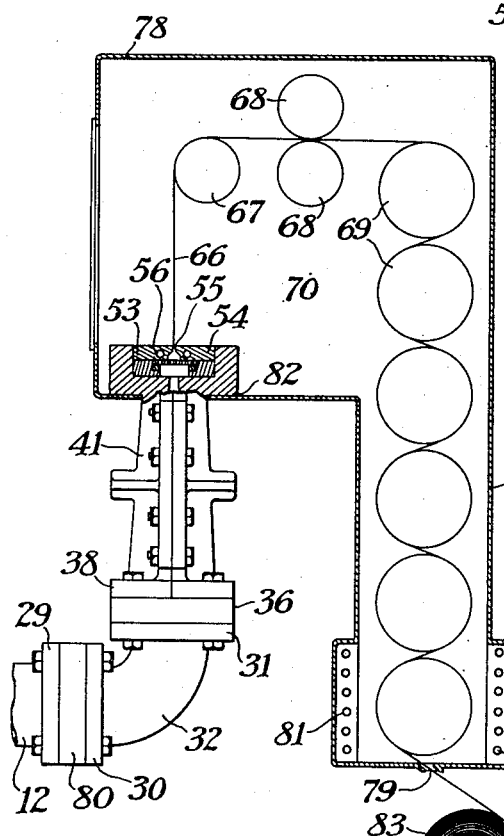
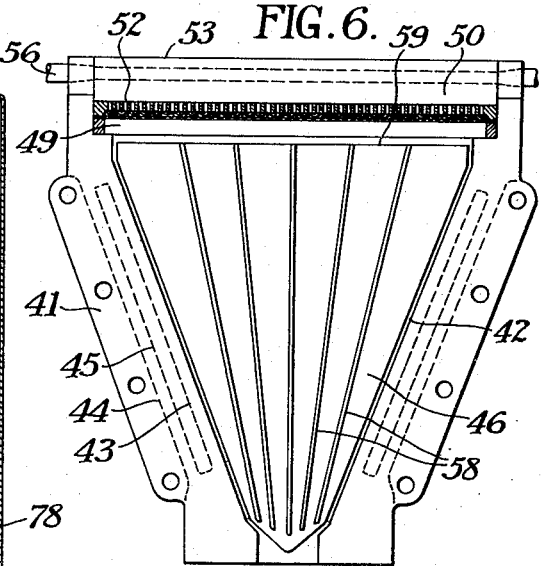
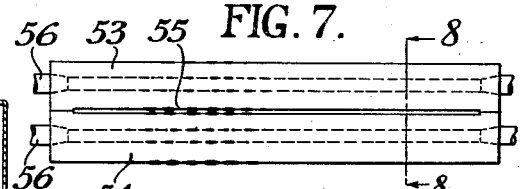
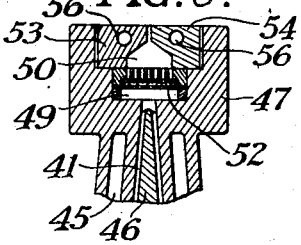
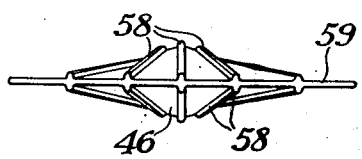
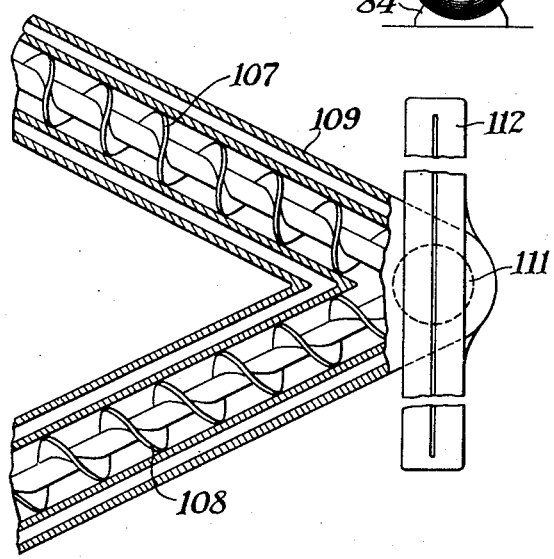
Frederick R. Conklin
John S. Kimble
INVENTORS
BY
ATTORNEYS Patented Nov. 18, 1941

2,262,989

UNITED STATES PATENT OFFICE 2,262,989

METHOD FOR FORMING THERMOPLASTIC SHEETING

Frederick R. Conklin and John S. Kimble, Kingsport, Tenn., assignors to Eastman Kodak Company, Rochester, N. Y., a corporation of New Jersey Application March 26, 1938, Serial No. 198,294

3 Claims. (Cl. 18—57)

This invention relates to processes for the manufacture of sheeting from thermoplastic materials and more particularly to processes for the manufacture of relatively thin sheets from thermoplastic molding compounds including cellulose esters and ethers such as cellulose acetate, cellulose acetate-propionate, methyl, ethyl and benzyl cellulose and other organic derivatives of cellulose, and other thermoplastic molding compounds such as thermoplastic resins which are suitable for use in the manufacture of laminated glass.

While various processes and different kinds of apparatus for extruding thermoplastic sheeting are known to the extrusion art, the fact remains that the sheeting produced by such processes for use in laminated glass is not as uniform as is desired in respect to physical and optical characteristics. Among the causes of the undesirable characteristics of the sheeting heretofore employed, are the presence of strains introduced during the extrusion processes, which may be released after the laminated glass is finally made and cause distortion of the plastic layer and produce unsightly bubbles or "blowins"; and the presence of residual low boiling solvents which curing will not remove and which often vaporize and form bubbles or "blowins" between the glass laminations and enhance the release of the strains. In some instances, although the physical dimensions of the sheeting are acceptable, the density and composition of different sections of the sheeting has sufficient variance to disadvantageously affect the resistance and optical properties.

As described in the copending application Serial No. 127,664, filed February 25, 1937 now Patent 2,177,660 of October 31, 1939, of which this application is a continuation in part, one of the present inventors has jointly invented a process and apparatus by which a markedly improved thermoplastic sheeting can be produced from solvent-free thermoplastic compositions. This sheeting, however, before being processed between sheets of glass to form laminated glass is not of high transparency and hence the precise appearance of the final product could not be too well estimated until the pressure of the laminating operation changes the sheet to a more transparent form. The present invention is a further improvement in apparatus and process and permits the production of a highly transparent solvent-free sheeting having additional characteristics even more suitable for laminated glass manufacture.

An object of the present invention is an improved substantially uniform and low-shrinking, highly transparent, solvent-free sheet, which is adaptable for use in making laminated glass.

Another object of the invention is an improved method for producing a thermoplastic sheet of high transparency having substantially uniform dimensions with a low-shrinking coefficient and a uniform density.

A still further object is a method of forming thermoplastic sheets having a minimum of releasable strains.

Another object is a method for regulating the surface of the sheeting prior to finishing. Other objects will appear hereinafter.

In accordance with one feature of the present invention these and other objects are attained by feeding a substantially uniform amount of a suitable thermoplastic material to a plurality of screw conveyors connected in series which are in turn connected by suitable conduits with an extrusion die. In passing through the first screw conveyor the material may be cooled to prevent gumming of the material adjacent the place of entrance, and it may be suitably heated when passing through the remaining conveyors at the same or different temperatures.

In accordance with another feature of the invention the plastic composition is fed at a uniform rate through the apparatus by being first introduced into a screw conveyor having a conveyor screw with a conical portion adjacent the input end and an extension thereof comprising a cylindrical portion for conducting the composition toward the extrusion die. The conical portion of the screw may have blades of varying pitch and the cylindrical portion of the screw may have blades of a constant pitch. In this arrangement the chamber housing the conical portion of the screw may be cooled to prevent gumming of the material adjacent the feed opening and the chamber housing the cylindrical portion of the screw may be heated to change this composition to a plastic state.

Another feature of the invention is the employment of one or more removable screens in the path of the flow of the plastic material, through the extrusion apparatus for subdividing, mixing and screening the material whereby a plastic of a uniform density and free from extraneous matter is obtained. A further advantage of such screens is that they permit increased extrusion speeds owing to the more uniform consistency of the plastic composition and materially reduce shrinkage in the final product.

In accordance with another feature of the invention, the plastic composition is forced through a fan or V-shaped distributing chamber having therein a centrally positioned distributor of similar shape, whereby the thickness of the onflowing plastic is reduced and its width gradually increased to correspond to the width of the slot die orifice. A related feature are mixing cavities one of which is positioned after the core and before the final screen and one of which is positioned after the screen to commingle the plastic before it passes to the die orifice.

Another feature of the invention is the method of vertically extruding the plastic sheet and improving the surface thereof without exerting substantial tension thereon.

Still another feature is the extrusion and surface conditioning of the sheeting in a temperature-controlled chamber.

The invention will be more clearly understood from the following detailed description with reference to the accompanying drawings in which:

Fig. 1 is a diagrammatic view in elevation of the preferred form of our improved apparatus for the production of thermoplastic sheeting;

Fig. 2 is a diagrammatic plan view of an alternative arrangement of the feeding mechanism for the apparatus showing a conical feed screw positioned at right angles to a cylindrical feed screw;

Fig. 3 is a plan view showing the structure of the screens employed in the apparatus;

Fig. 4 is an elevation of the screen in section more clearly showing its structure;

Fig. 5 is a diagrammatic view in elevation showing the extruded sheet being conducted vertically away from the die orifice and being ironed by a plurality of rolls in an enclosed heated chamber;

Fig. 6 is an enlarged diagrammatic plan view of the V shaped distributing chamber and the V shaped distributor member taken on the line 6—6 of Fig. 1 and showing a section of the compacting cavity, the final screen and the die block;

Fig. 7 is a plan view of the die head showing the die orifice and the position of the cooling channels;

Fig. 8 is a side elevation of the die head showing a portion of the distributor member taken on the line 8—8 of Fig. 7;

Fig. 9 is a view of the output end of the distributor member showing the distributing and supporting vanes, and;

Fig. 10 is an alternative arrangement showing a diagrammatic plan view of two separate extrusion screws (broken away) cooperating to force the plastic through a wider extrusion die (as indicated by the broken portion).

Referring to Fig. 1 there is shown an extrusion apparatus for the continuous production of thermoplastic sheeting comprising a conveying casing 12 having a chamber 13 in which is suitably positioned a screw conveyor 14. There is a hopper like opening 11 positioned in the upper side of the casing 12 through which the thermoplastic material 10 may be introduced into the conveyor in uniform amounts. A suitably plasticized cellulose organic derivative composition, devoid of volatile solvent, such as described in the copending Blackard and Waterman application Serial No. 127,660 may be employed for making sheeting in the present apparatus or volatile solvent-free thermoplastic resins such as those disclosed in the copending Kimble et al. application Serial No. 147,934 or other suitable thermoplastic resins may be employed. The most satisfactory operation of the present apparatus is dependent on the delivery to the hopper 11 of uniform amounts of theromplastic material. The casing 12 has a heating jacket 15 formed by the double walls 16 and 17 through which cooling and heating fluids may be passed, the conducting pipes not being shown. It will be noted that casing 12 and chamber 13 initially are of a conical form which tapers to a longer cylindrical portion. The screw 14 has a conical portion 18 and a cylindrical portion 19 which operate in the respective conical and cylindrical portions of the chamber. The shaft 21 has an internal chamber 22 to which suitable heating or cooling fluids may be conducted by pipe 23 and removed by pipe 24. The shaft 21 is suitably journaled in the end of the casing at 25 and the screw 14 is rotated by a suitable motive force being applied to pulley 26 which is mounted on the shaft 21. The rotation of the screw 14 conveys the plastic through the heated chamber 13 and the output opening 20. The feed screw 14 may have the conical and/or cylindrical blades at a constant or variable pitch, or any suitable combination of the two.

If desired, the screw conveyor mechanism may be composed of two interconnected screw chambers, one of which contains the conical screw and the other the cylindrical screw. This arrangement will permit greater variability in heating or cooling the screws and also then may be rotated at different rates. Such an arrangement is shown in Fig. 2 where the two screws are positioned at right angles to each other. As shown, in this figure the conical screw 91 is mounted in chamber 96 in the conical casing 92, its shaft 93 being suitably journaled in end of the casing at 94. The casing 92 has cooling jackets 95 formed between the walls thereof for initially cooling the plastic material which is introduced into the chamber 96 through an opening similar to opening 11 in Fig. 1 not shown in the drawings. Chamber 96 of casing 92 is suitably connected with chamber 97 of casing 98 to which conical screw 91 conveys the cooled plastic composition. Casing 96 also has double walls which form a heating jacket 99 for the casing. In chamber 97 is positioned cylindrical screw 100 having its shaft 103 suitably journaled in the end of the casing at 104. The screw and chamber is shown broken away at 101 and 102 it being understood that this device can be used to replace the screw conveying system, shown in Fig. 1. It will be understood that the two screws can be rotated by any suitable motive force being applied to the respective shafts. In the event an unusually wide sheet is desired, a feeding arrangement such as shown in Fig. 10 can be employed. As shown in the drawings a double feeding mechanism having a pair of cylindrical screws 107 and 108 mounted in a jacketed casing 109 feeds the thermoplastic material to a compacting chamber 111 from whence it is forced vertically upward thru die 112. It will be understood that either of the above described arrangements of the conical screws can be associated herewith. As the plastic material 10 is forced out of the chamber 13 it passes thru screen 27. This screen 27 is mounted on an annular supporting member 80 which is suitably attached to flange 29 of casing 12.

A typical screen assembly structure is shown in more detail in Figs. 3 and 4. As shown in these figures the assembly comprises a plate 71 having a plurality of apertures 72 therein. A heavy screen 73 is placed against plate 71 and a fiber screen 74 is placed against the heavy screen 73. These screens and the plate are held together in any suitable manner, for example, by welding. The assembly is then inserted into the recess 75 of the screen supporting member 80. A gasket 77 may be placed between the screen assembly and the shoulders of the supporting recess 75.

We prefer that the distributor be operated with a plurality of screens of decreasing fineness when operating on semiplasticized or mechanical mixtures of fine particles of cellulose ethers, esters or resins and their respective plasticizers. The screens give the mixing necessary to deliver a uniform plastic to the orifice required for the production of a uniformly gauged sheet of extremely low shrinkage.

An elbow conduit 32 having double walls, 33 and 34 forming a heating jacket 35 is attached on its flange 30 to the screen support 28 and in turn supports on its flange 31 in a vertical position a second annular screen support member 36 containing a screen 37. This is of a general construction as just described in connection with Figs. 3 and 4.

Mounted on the screen support member 36 by its flange 38 is a V-shaped distributor casing 41 having a chamber 42 therein. The casing 41 has double walls 43 and 44 which form a heating jacket 45. Heating fluids can be conducted therein by conduits not shown. Within the chamber 42 is positioned a V-shaped distributor member 46, the purpose and construction of which will be explained hereinafter. The upper end of the casing has a square U-shaped portion 47 of a length approximately equal to the desired width of the extruded sheet. A third annular screen support 48 in which a screen 52 is positioned, is mounted in the U-shaped portion of the casing. The space 49 beneath screen 52 serves as a place wherein the onflowing composition can commingle and be compacted into a dense mass. Above the screen assembly 52 is positioned a pair of die blocks 53 and 54 forming a slot orifice 55 and a cavity 50. The die blocks contain a pair of tubes 56 positioned adjacent the orifice 55, through which heating or cooling fluids can be passed to regulate the temperature of the die. The extruded sheet is shown at 66. The screen 52 separates cavity 50 from cavity 49 and both of these cavities permit the onflowing plastic to commingle and become compressed, as will be further explained in connection with the operation of this device.

The V-shaped distributor casing 41 and the distributor member 46 as well as the associated screen and die members is more clearly shown in Fig. 6. As shown in these drawings, the distributor member 46 comprises a solid metallic member having a plurality of supporting vanes 58 positioned in spaced relation about its surface. This member 46 is placed in the chamber 42 of the distributor casing 41. The chamber 42 is thus restricted to the space between the vanes 58 and to the space between body of the member and the wall of the casing. The output end of the distributor 46 is shown in Fig. 9, the end of the distributor having the form of an elongated straight edge 59. It will be evident from these drawings that the vanes 58 act to spread the thermoplastic composition out to a width approximately equal to the length of the extrusion slot 55. As the thermoplastic composition flows into cavity 49 it becomes compressed against screen 52 and therefore is compacted into a uniformly dense mass. When it passes thru the screen 52 it again becomes compacted in cavity 50 before it is extruded thru the die.

The operation of the distributor 46 and compacting cavities 49 and 50 as well as the position of the die blocks 53 and 54 may be clarified by referring to Figs. 7 and 8 in which similar numerals represent similar parts.

The distributor may be operated without mixing screens especially in cases in which the feed consists of thoroughly preplasticized material which does not require the additional mixing given by the screen to produce uniform sheets.

Referring to Fig. 5 there is shown an enclosed heating and ironing system for further processing the extruded sheet. The heating and ironing system comprises a chamber 70 formed by casing 78. Heating coils 81 are mounted at the lower extension of the casing adjacent the outlet orifice 79. The casing 78 fits over the extrusion apparatus as shown at 82 thereby preventing substantial cooling of the sheet before it is ironed.

The sheet 66 on leaving the orifice 55 is drawn vertically up over the guide roll 67 and between a pair of drawing rolls 68 and between the plurality of ironing rolls 69, which are mounted one above the other. The ironing rolls 69, which are hollow, may be suitably heated by conducting heating fluids thereto as is wellknown in the art. The sheet is then wound up on a wind-up roll 83 mounted on a base 84 or may be otherwise processed.

For the continuous production of a thermoplastic sheet, substantially uniform amounts of the thermoplastic composition 10 is regularly introduced into the hopper 11 of the apparatus shown in Fig. 1. In general, the amount should be substantially equal to that extruded from the die. Any suitable measuring device which operates to deliver uniform charges to the hopper 11 may be employed. For example, a drum feed mechanism such as disclosed in Pack U. S. Patent 2,035,735 or a vibrating weighing pan arrangement as shown in the copending application Serial No. 127,664 now Patent 2,177,660. This feeding apparatus can be operated in synchronism with the conveyor screws by any suitable manner known in the art so as to regulate the amounts fed to the apparatus in accordance with the amount of sheeting being continuously produced.

Assuming for the sake of illustration that the apparatus is charged with material and a sheet has been continuously formed as shown in Figs. 1 and 5, one may continuously produce such a sheet by causing screws 14 and 18 to turn by a motive force acting on pulley 26 and heating fluid such as steam or hot water is permitted to flow through the heating jackets 15, 35, 45 and 56 of the apparatus and cold water through the hollow screw shaft 23. As the screw revolves, the thermoplastic composition is forced along through the heated chamber 13 and becomes soft and plastic. The length of the chamber may vary within suitable limits, in general, it should be long enough to provide sufficient heating surface at a required temperature, to soften the composition so that it will pass through the screen 27 without too much resistance. The continuous rotations of the screws will force the plastic compositions through the screen 27. This screen will remove extraneous matter such as dirt and other foreign bodies which may have been accidently incorporated into the thermoplastic composition and will also further subdivide and mix the composition. After passing screen 28 the screened composition is forced along by the continuous revolutions of the screws on the column of plastic material through the heated chamber 32 and up through screen 37 where any remaining lumps of plastic material are held back until they are soft enough to be pushed through the screen. This screen also takes out additional impurities and further subdivides and mixes the composition. On passing screen 37, the onflowing plastic is again subdivided as it comes into contact with the V-shaped distributor member 46. The thermoplastic material is thus spread out into a flattened thin layer around the distributor member 46 and is thus exposed on the outer side to heat directly transmitted from heating jacket 45 and on the inner side by heat transferred over the supporting vanes 58 to the main body of the distributor. The distributor 46 as shown more clearly in Fig. 6, aided by the radial vanes 58 spreads the plastic material into a wide area and as will be clear from Fig. 9, the material flows off the opposite end of the distributor in a form approaching that of a thick sheet. This material now is further commingled and compressed in a chamber 49 from whence it is forced through screen 52 which further mixes and filters the material. It then is finally commingled in cavity 50 just below the die orifice and is then forced out of the die thru the orifice into a thin sheet 66. It will be understood that the different screens may be constructed exactly the same or the last two screens may be of progressively smaller mesh than the first. The screen assembly may be suitably arranged so that the screens can be easily withdrawn and the foreign materials collected in the screen and adjacent the screens can be removed from the apparatus from time to time.

The vertical up draft extrusion is of particular advantage in the production of thin sheets which have a tendency in the case of horizontal extrusion to sag. The sheet can be extruded vertically down in which case the minimum draft which is placed on the sheet is equal to the weight of the sheet hanging between the orifice and the next point of support.

If desired, this sheet, which is conducted away from the die without substantial tension being exerted thereon, can be wound directly on a spool not shown in the drawings. Such a sheet may be further processed according to the method described in the copending application Serial No. 127,663, now Patent 2,177,659.

However, in accordance with the present invention we prefer to process the sheet in the apparatus shown in Fig. 5 associated with the extrusion die nozzle. As shown in these drawings the extruded sheet on leaving the vertical extrusion die is conducted over guide roll 67 and between a pair of driving rolls 68 which are driven at a rate less than that which will produce a stretch or strain in the sheet. The sheet 66 then passes between the plurality of ironing rolls 69 in such a manner that opposite sides of the sheet will contact alternate rolls and so that both sides of the sheet can be ironed during one passage of the sheet through the system. The ironing rolls 69 are suitably mounted so that the distance between them can be regulated to prevent too severe bending of the sheet as it alternates between opposite sides of the rolls. The ironing rolls 69 are mechanically rotated at a rate which will not produce a stretch in the sheet. They also may be internally heated in any suitable manner known to the art. We have found that this ironing treatment will change the sheet from a translucent form in which form it is extruded from the die to a highly transparent form which can be employed in laminated glass without further operations to increase its transparency. On leaving the final ironing roll, the sheet 66 is conducted thru opening 79 to a windup roll 83 mounted on support 84. This windup roll may be driven by any suitable motive force, not shown, and is rotated at a rate less than that which will exert substantial tension on the rolls. The ironing operation also improves the smoothness of the sheet and in a slight degree improves its thickness. As shown in Fig. 5, the ironing rolls are positioned in an enclosed heated chamber whereby the temperature of the sheet is maintained sufficiently high to prevent substantial cooling of the sheet before it comes in contact with the heated ironing rolls. If desired, the die blocks 53 and 54 may be maintained at temperatures above or below the temperature of the sheet.

As indicated above, we have found that by both conducting the extruded sheet away from the die and processing it in a manner which does not exert substantial tension in the sheet, substantially no releasable strains are introduced into the sheet.

The chamber is suitably heated by the heating coils 81. The temperature of the chamber can be maintained substantially constant since the outlet opening 79 through which the sheet passes to the windup roll is of a narrow width.

The temperatures employed in this extrusion apparatus are substantially as follows: The temperature of the extrusion chambers are generally between 130 to 160° C. The distributor chamber is maintained at a temperature of from 120 to 150° C. and the ironing temperatures are 60 to 170° C. The temperature of the enclosed ironing chamber is approximately from 50 to 150° C. On the thinner sheets such as .015 inch these temperatures would be somewhat lower on account of the heat transfer being lower at some points and higher at others. In general the temperatures would all be lower in case of the resins which are normally not self supporting at room temperatures.

The employment of our invention in making thermoplastic sheeting permits the production of a continuous sheet having improved low shrinkage characteristics and surface characteristics as well as improved optical properties. Owing to the multiple screening of the material at temperatures at which colloidization takes place between the cellulose ester or resin base material and the plasticizer, a more homogeneous composition which is free from pieces of the original granules and particularly free from dirt and other foreign particles is formed into the sheet. The sheet consequently has improved optical properties and is particularly free from small areas of slightly different refraction. It also appears that owing to the uniform consistency of the composition that the inherent tendency to shrink is greatly reduced.

Since care is taken to prevent any substantial tension from being exerted on the extruded sheet, the shrinkage of the final product is consequently relatively low. In fact the shrinkage of a sheet made by using the preferred method described above has a shrinkage as low as from 8 to 12% which is well below the upper tolerance beyond which "blowins" occur. This figure is based on the results of tests made on a number of different thermoplastic sheets from which a sample of sheeting "1 x 6" is accurately cut. The sample is placed on a sheet of cardboard and put in an oven at 265° F. for one minute, and is then cooled and measured for change of dimensions. The sheet is of uniform density, tensile strength and flexibility. Since no volatile solvents are employed in the composition, the sheets require no curing for removal of solvent and the sheets may, therefore, be immediately used or safely stored for future use.

We claim:

1. The continuous process of forming an improved and low shrinking transparent thermoplastic sheet which comprises extruding a volatile solvent-free organic thermoplastic composition to form a translucent sheet, screening the composition during the extrusion operation, conducting the extruded sheet along in a manner and at a rate less than that which is sufficient to impose any substantial tension on the sheet and hot rolling the sheet without substantial tension being exerted thereon until the sheet becomes transparent.

2. The continuous process of forming an improved and low shrinking transparent thermoplastic sheet which comprises extruding a volatile solvent-free cellulose organic acid ester composition to form a translucent sheet, alternately screening and compressing the composition during the extrusion operation, conducting the extruded sheet along in a manner and at a rate less than that which is sufficient to impose any substantial tension on the sheet and hot rolling the sheet without substantial tension being exerted thereon until the sheet becomes transparent.

3. The continuous process of forming an improved and low shrinking transparent thermoplastic sheet which comprises extruding a volatile solvent-free cellulose acetate composition to form a translucent sheet, alternately screening and compressing the composition during the extrusion operation, conducting the extruded sheet along in a manner and at a rate less than that which is sufficient to impose any substantial tension on the sheet, and hot rolling the sheet without substantial tension being exerted thereon until the sheet becomes transparent.

FREDERICK R. CONKLIN.
JOHN S. KIMBLE.